United States Patent
Stylianou et al.

(10) Patent No.: US 8,331,628 B2
(45) Date of Patent: Dec. 11, 2012

(54) VISION ASSISTANCE USING MOBILE TELEPHONE

(76) Inventors: Georgios Stylianou, Nicosia (CY); Stavros Papastavrou, Nicosia (CY)

(*) Notice: Subject to any disclaimer, the term of this patent is extended or adjusted under 35 U.S.C. 154(b) by 485 days.

(21) Appl. No.: 12/633,288

(22) Filed: Dec. 8, 2009

(65) Prior Publication Data
US 2010/0144291 A1    Jun. 10, 2010

Related U.S. Application Data

(60) Provisional application No. 61/201,182, filed on Dec. 8, 2008.

(51) Int. Cl.
G06K 9/00    (2006.01)

(52) U.S. Cl. .................. 382/114; 382/229

(58) Field of Classification Search .................. None
See application file for complete search history.

(56) References Cited

U.S. PATENT DOCUMENTS

| | | | |
|---|---|---|---|
| 2,615,992 A | 10/1952 | Flory et al. | |
| 3,346,845 A | 10/1967 | Fomenko | |
| 5,942,970 A | 8/1999 | Norman | |
| 6,055,048 A | 4/2000 | Langevin et al. | |
| 6,985,631 B2 * | 1/2006 | Zhang | 382/237 |
| 7,230,538 B2 | 6/2007 | Lai et al. | |
| 7,310,605 B2 | 12/2007 | Janakiraman et al. | |
| 7,477,780 B2 | 1/2009 | Boncyk et al. | |
| 7,525,034 B2 | 4/2009 | Nease et al. | |
| 7,565,139 B2 | 7/2009 | Neven, Sr. et al. | |
| 7,598,976 B2 | 10/2009 | Sofer et al. | |
| 7,996,317 B1 * | 8/2011 | Gurz | 705/45 |
| 2002/0012462 A1 * | 1/2002 | Fujiwara | 382/165 |
| 2002/0058536 A1 | 5/2002 | Horii et al. | |
| 2005/0031171 A1 | 2/2005 | Krukowski et al. | |
| 2005/0071167 A1 | 3/2005 | Levin et al. | |
| 2006/0280338 A1 | 12/2006 | Rabb | |
| 2007/0085993 A1 | 4/2007 | Brown | |
| 2007/0211947 A1 | 9/2007 | Tkacik | |
| 2007/0230748 A1 | 10/2007 | Foss | |
| 2007/0230749 A1 | 10/2007 | Foss | |

(Continued)

FOREIGN PATENT DOCUMENTS

FR    2453451    10/1980

(Continued)

OTHER PUBLICATIONS http://www.cnbc.com/id/35911747/Coming_Soon_Take_Photo_Of_Check_Deposit_It_in_Bank.*

Primary Examiner — Brian P Werner
Assistant Examiner — Shefali Goradia
(74) Attorney, Agent, or Firm — Michael Best & Friedrich LLP

(57) ABSTRACT

Methods and system for providing vision assistance using a portable telephone with a built-in camera. In some embodiments, the system identifies the value of a bank note by determining the average number of transitions between black and white in each vertical line of pixels corresponding to a numeric digit. In other embodiments, the system captures an image and identifies an object in the image by comparing the value of each pixel in the image to a threshold intensity and marking the pixels that exceed the threshold. The system then generates a plurality of candidate groups by grouping marked pixels that are within a predetermined distance from other marked pixels. The object is identified based on the relative position of each candidate group to other candidate groups.

9 Claims, 15 Drawing Sheets

U.S. PATENT DOCUMENTS

| | | |
|---|---|---|
| 2007/0297647 A1 | 12/2007 | Hung-Chi |
| 2008/0137958 A1 | 6/2008 | Wang et al. |
| 2008/0162474 A1 | 7/2008 | Thong et al. |
| 2008/0162603 A1 | 7/2008 | Garg |
| 2008/0260210 A1 | 10/2008 | Kobeli et al. |

FOREIGN PATENT DOCUMENTS

| | | |
|---|---|---|
| WO | 2005/085781 | 9/2005 |

* cited by examiner

VISION ASSISTANCE USING MOBILE TELEPHONE

RELATED APPLICATIONS

This application claims priority to U.S. Provisional Patent Application No. 61/201,182 titled "VISION ASSISTANCE USING MOBILE TELEPHONE," filed Dec. 8, 2008, the entire contents of which are incorporated herein by reference.

BACKGROUND

The present invention relates generally to visual assistance systems for visually impaired persons and, more particularly, to the use of a mobile telephone with a built-in camera to provide information to a visually impaired person regarding objects or light sources in a room or other environment.

Visually impaired persons encounter a number of challenges in their daily routine ranging from orientation and mobility to the identification and location of objects. Systems have been proposed that provide limited guidance information. However, such systems generally require the visually impaired person to purchase and carry additional hardware equipment.

SUMMARY

The invention provides methods and systems for providing vision assistance using a portable telephone with a built-in camera. In one embodiment, the system captures an image through the built-in camera and identifies an object in the captured image. The system compares a brightness value of each pixel in the image to a threshold intensity. The pixel is marked if its value exceeds the threshold intensity. The system then identifies a plurality of candidate groups including one or more marked pixels. The marked pixels of each candidate group are within a threshold distance of the other marked pixels in the same candidate group. The object in the image is then identified based on the relative position of each candidate group to other candidate groups. For example, if the candidate groups form a circle, the system (in some instances) identifies the object as a circular plate.

In some implementations, the system determines the geometric center of marked pixels in each of the candidate groups. The object is then identified by comparing the location of one geometric center to the location of another geometric center. The system differentiates between multiple objects in the same image by comparing the distance between the geometric center of each candidate group to a threshold. Candidate groups that are within the threshold distance from other candidate groups are determined to be part of the same object and are, therefore, included in the same meta group.

In another embodiment, the invention provides a method of providing vision assistance using a portable telephone with a built-in camera. The method includes capturing an image through the built-in camera and locating an object in the image. A determination of which pixels in the image are objects and which pixels are parts of the background is performed by comparing the value of each pixel to an estimated background color. An object is identified as a group of adjacent pixels that are not be part of the background.

In certain specific embodiments, methods and systems are utilized to identify a value of a bank note (e.g., a U.S. dollar or a Euro). The system captures an image of the bank note and converts the image to black and white. The system then locates the numeric value printed on the bank note in the image and divides the numeric value into a plurality of vertical lines. Vertical lines that include only white pixels are identified as the end of numeric digits (e.g., the separation between two numeric digits or the end of the printed numeric value). The system analyzes each vertical line corresponding to a first digit in the numeric value and determines the number of transitions between black and white in each vertical line. The system then determines the average number of transitions for the vertical lines corresponding to the first digit and identifies the value of the first digit based on the average number of transitions between black and white. For example, in some embodiments, if there are no transitions between black and white, the digit is identified as a "one." If there are two transitions, the digit is identified as a "zero." If there are three transitions, the digit is either a "two" or a "five."

Other aspects of the invention will become apparent by consideration of the detailed description and accompanying drawings.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

Figure 1:
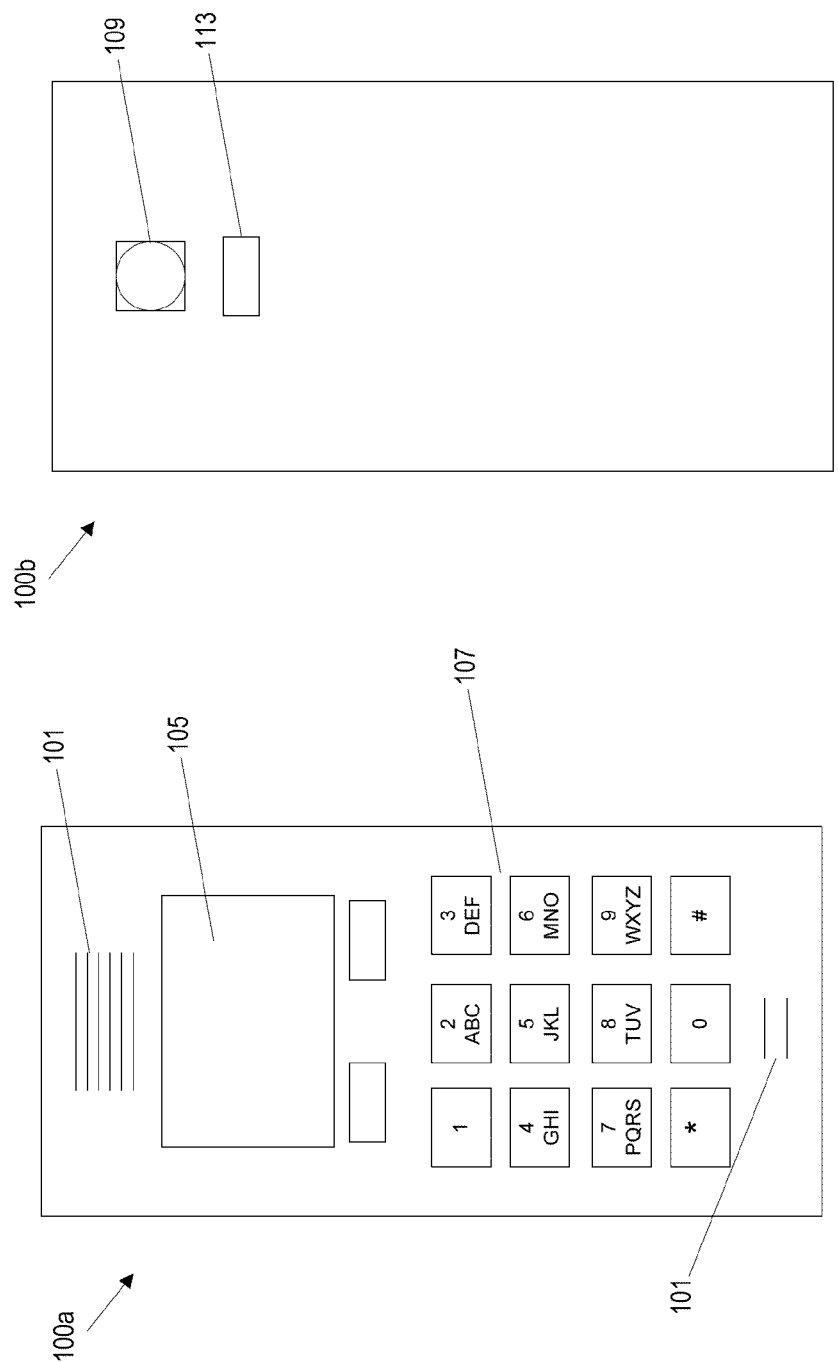
FIG. 1 illustrates the front and back sides of a mobile telephone equipped with a camera according to one embodiment of the invention.

FIG. 1 shows a mobile cellular telephone equipped with a digital camera 100. The image to the left is the front side of the telephone 100a and the image on the right is the rear side of the telephone 100b. The front side of the telephone 100a includes a speaker 101, a microphone 103, a display 105, and a keypad 107 including several different buttons. The rear side includes a digital camera 109 that is capable of capturing still images and video and a flash 113. Embodiments are described below with reference to components of the telephone 100 illustrated in FIG. 1. However, the invention could be implemented using other mobile devices including, for example, a personal digital assistant (PDA) or portable media player (e.g., mp3 player).

Figure 2:
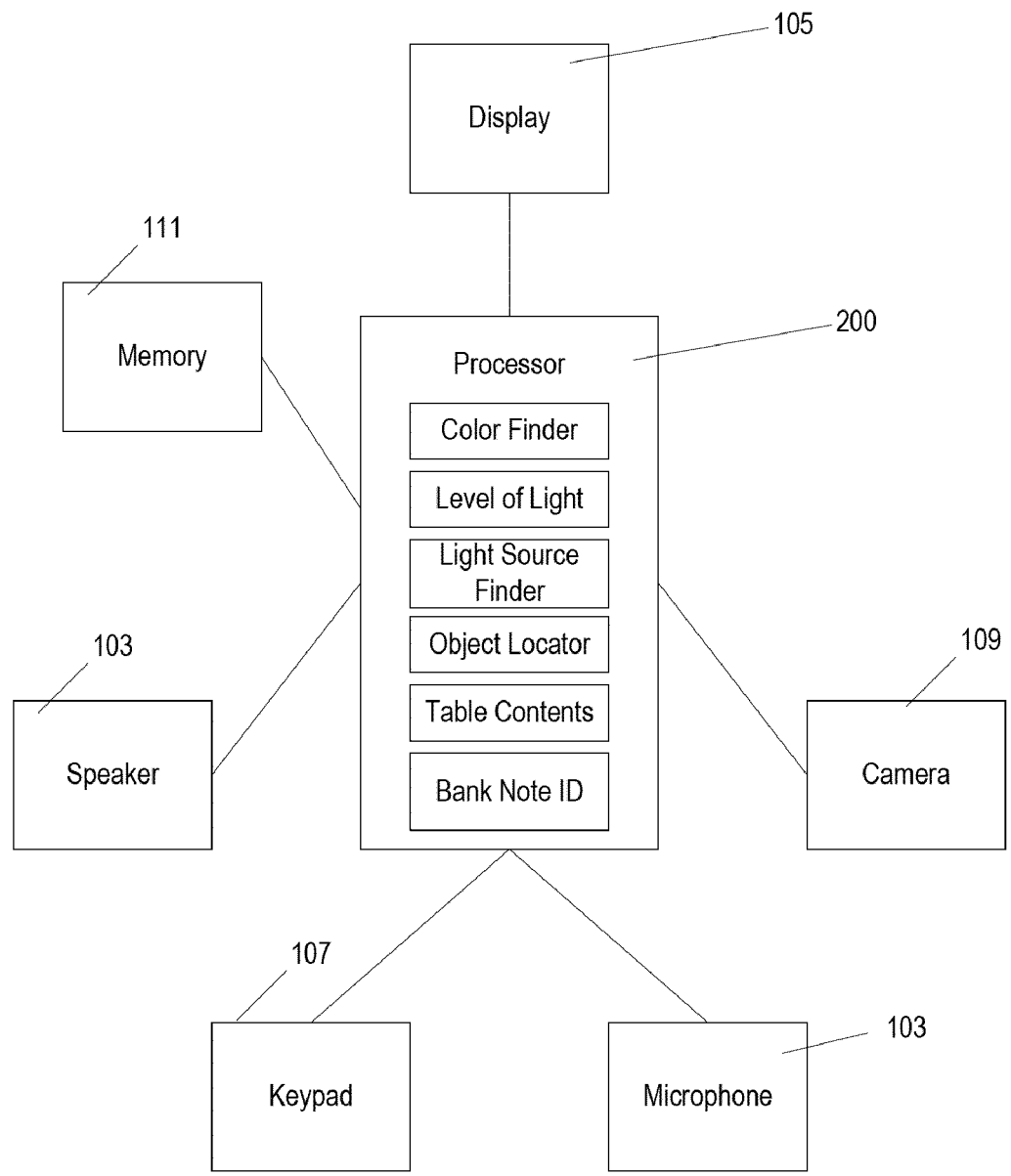
FIG. 2 is a schematic diagram showing the components of the camera of FIG. 1.

The schematic diagram of FIG. 2 illustrates the components of the telephone 100. A microphone 103, keypad 107, and camera 109 provide inputs to a processor 200. The processor 200 stores data to a memory 111. The memory device can be incorporated directly into the processor 200 or can be connected to the processor as a separate unit. The processor 200 provides output to the display 105 and the speaker 101.

In addition to managing processes associated with incoming and outgoing telephone calls, the processor 200 also runs software applications stored to the memory 111 of the telephone 100. As shown in FIG. 2 and as described in further detail below, processor 200 executes several processes using the telephone's built in camera 109. Among other things, these visual assistance processes can assist a visually impaired user with identifying the color of an object ("Color finder"), determining the level of light in a room or area ("Level of Light"), locating the source of a light ("Light Source Finder"), locating an object ("Object Locator"), identifying a series of object ("Table Contents"), and identifying the value of a bank note. These processes are encoded as computer executable instructions stored on the memory of the telephone 100.

Figure 3:
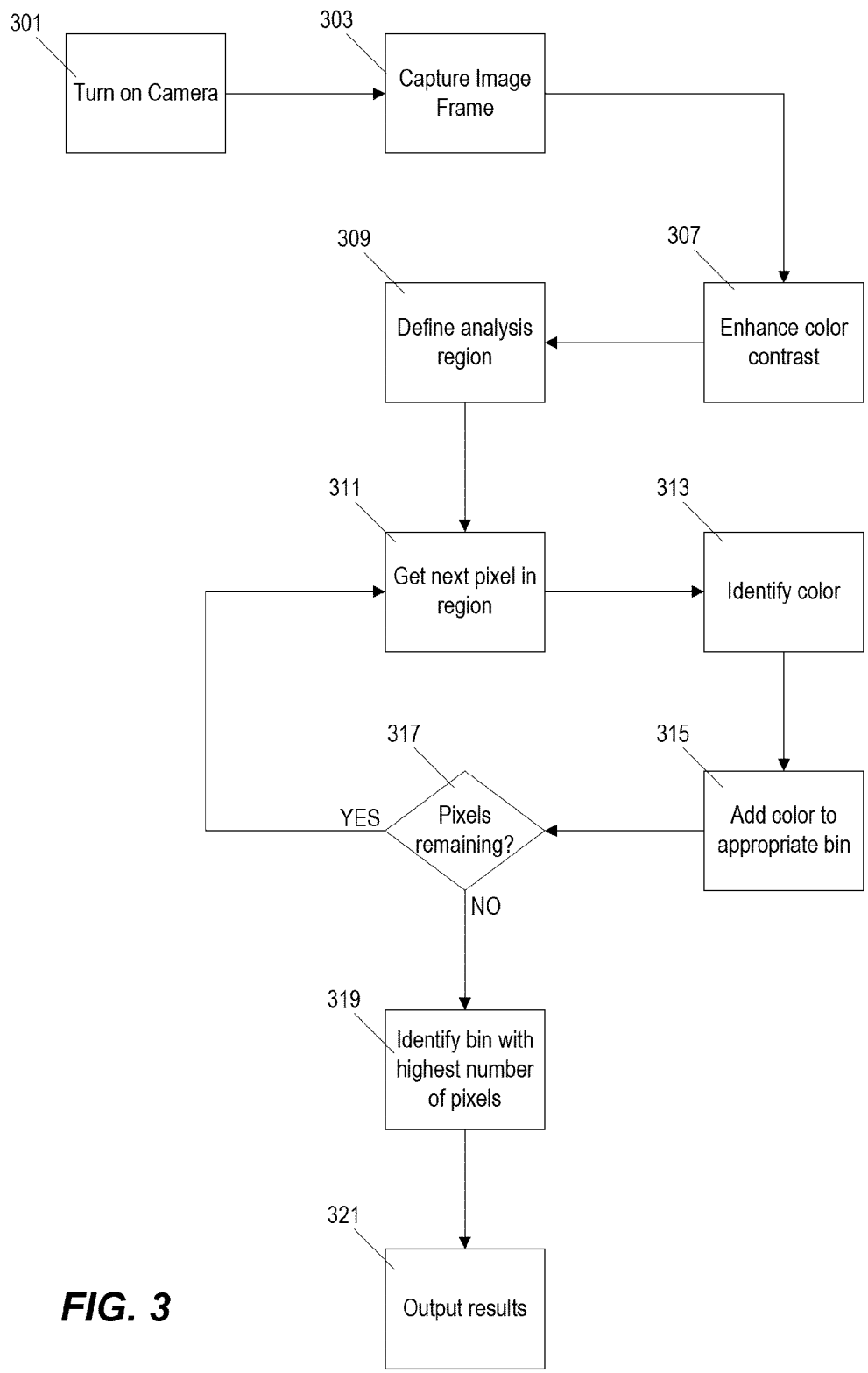
FIG. 3 is a flowchart showing the operation of the system when determining the color of an object.

FIG. 3 illustrated the "Color Finder" process. The "Color Finder" process assists a visually impaired person in determining the color of an object or surface. The process assists various types of visual impaired persons including color blind persons who are unable to distinguish between red and green hues. The camera turns on when the process is executed (step 301). The user directs the camera toward the target image or surface. In most digital camera phones, digital images are captured in real-time and displayed as a "view finder image." The Color Finder module described in FIG. 3 processes these view-finder images without focusing the image and storing it to the memory 111 (step 303). However, in other embodiments, an image can be captured and stored before being processed.

The "Color Finder" module begins processing the view finder image by enhancing the color contrast to adjust for bright or dim light conditions (step 307). Each pixel in the captured image is represented using RGB encoding including three integer values between 0 and 255. The "Color Finder" module creates two histogram data structures for use in the contrast adjustment process. Each histogram includes a series of bins for various values between 0 and 255. Each pixel in the view-finder image is analyzed and the highest and lowest of the three RGB values is identified for each pixel. A count is added to the appropriate bin in the first histogram for the highest of the three values and to the appropriate bin in the second histogram for the lowest of the three values.

For example, in some embodiments, each of the two histograms includes five bins. The first bin is for values 0-50, the second is for values 51-100, the third is for values 101-150, the fourth is for values 151-200, and the fifth is for values 201-255. If the RGB values for a pixel are 27, 135, and 75, a count is added to the third bin of the first histogram (i.e., the histogram for high values) representing the "G" value of 135. A count is also added to the first bin of the second histogram (i.e., the histogram for low values). It is noted that the actual color of the highest RGB value is not considered in the calculation and creation of these histograms. At this stage, the "Color Finder" module is only considering the brightness of the pixel regardless of color.

After all of the pixels have been analyzed, module identifies a high pixel calibration value ("d") and a low pixel calibration value ("c") based on the two histograms. The high pixel calibration value represents the highest 5% of the pixel values and the low pixel calibration value represents the lowest 5% of pixel values. Consider, for example, a distribution for 100 pixels in the five bin first histogram (i.e., the histogram for high values) described above is 5 in the first bin, 15 in the second bin, 55 in the third bin, 22 in the fourth bin, and 3 in the fifth bin. In this example, the highest 5% is located in the fourth or fifth bin. As such, the "Color Finder" module identifies 151 as a high pixel calibration value ("d"), because at least 5% of the pixels in the image include at least one RGB value that is greater than 151. If a second histogram (i.e., the histogram for low values) had the same distribution, the "Color Finder" module identifies 50 as a low pixel calibration value ("c"), because at least 5% of the pixels in the image include at least one RGB value that is less than 50.

The "Color Finder" module then adjusts the contrast of the image using the high pixel calibration value and the low pixel calibration value (d=151 and c=50, respectively, in the example above). The RGB values of each pixel in an image are adjusted using the following equation: $p'=((p-c)*255)/(d-c)$. "p" is the RGB value of a particular pixel (p1, p2, p3), "c" is low pixel calibration value described above (c, c, c), and "d" is the high pixel calibration value described above (d, d, d). p' values are rounded to the nearest integer. Because this equation cause p' values for RGB values that are less than "c" to drop below zero, the p' for such pixel values is set to zero. As such, using the "c" and "d" calibration values described above, if the pixel in the view-finder image is represented by the RGB values (27, 135, 75), the contrast adjustment step of the "Color Finder" module changes the values to (0, 215, 63) or (0, ((135−50)*255)/(151−50), ((75−50)*255)/(151−50)).

Although this example calculates the "c" and "d" values using all of the pixels in a single view-finder image, in other embodiments, the system processes on a subset of pixels scattered throughout an image. Furthermore, in some embodiments, the system will continue to add values to the two histograms and continue to adjust the "c" and "d" values as long as the module is operating.

After the image contrast is enhanced, the user defines a region of analysis (step 309). For example, if the user is interested only in determining the color of a particular part of an object, the user defines the analysis region to include only that part. Alternatively, the region can be selected to include the entire image frame. The processor 200 then begins to cycle through each pixel (step 311) in the defined analysis region to identify the color of each pixel (step 313). The processor in this example converts the pixels enhanced RGB values into an HSL (Hue, Saturation, Lightness) encoding. The processor 200 then uses a database of HSL color matrices stored on the memory 111 to identify the closest color. The pixel is then added to the appropriate histogram bin (step 315). In this example, a total of twelve bins are created representing the following colors: white, black, gray, red, orange, yellow, blue, cyan, brown, pink, and purple. Other embodiments may include more, fewer, or different histogram bins. If there are additional pixels in the analysis region that have not yet been processed (step 317), the processor 200 proceeds to analysis (steps 311, 313, and 315) for each remaining pixel.

After all of the pixels in the analysis region have been analyzed, the processor 200 identifies the histogram bin with the highest number of pixels (step 319) and outputs that color associated with that bin as the identified color (step 321). In some embodiments, the processor calculates the average RGB values for the pixels in the identified bin and determines the most dominant color in the captured image and the dominant shade of that color. In some embodiments, the processor 200 provides a list of all major color found in the image and presents the results to the user by identifying all other bins that have a number of pixels that is greater than 50% of the pixel in the maximum bin (e.g., if the green bin has 105 pixels, all other bins with 53 or more pixels are also identified). The results are presented to the user textually through the display 105 or aurally through the speaker 101.

Figure 4:
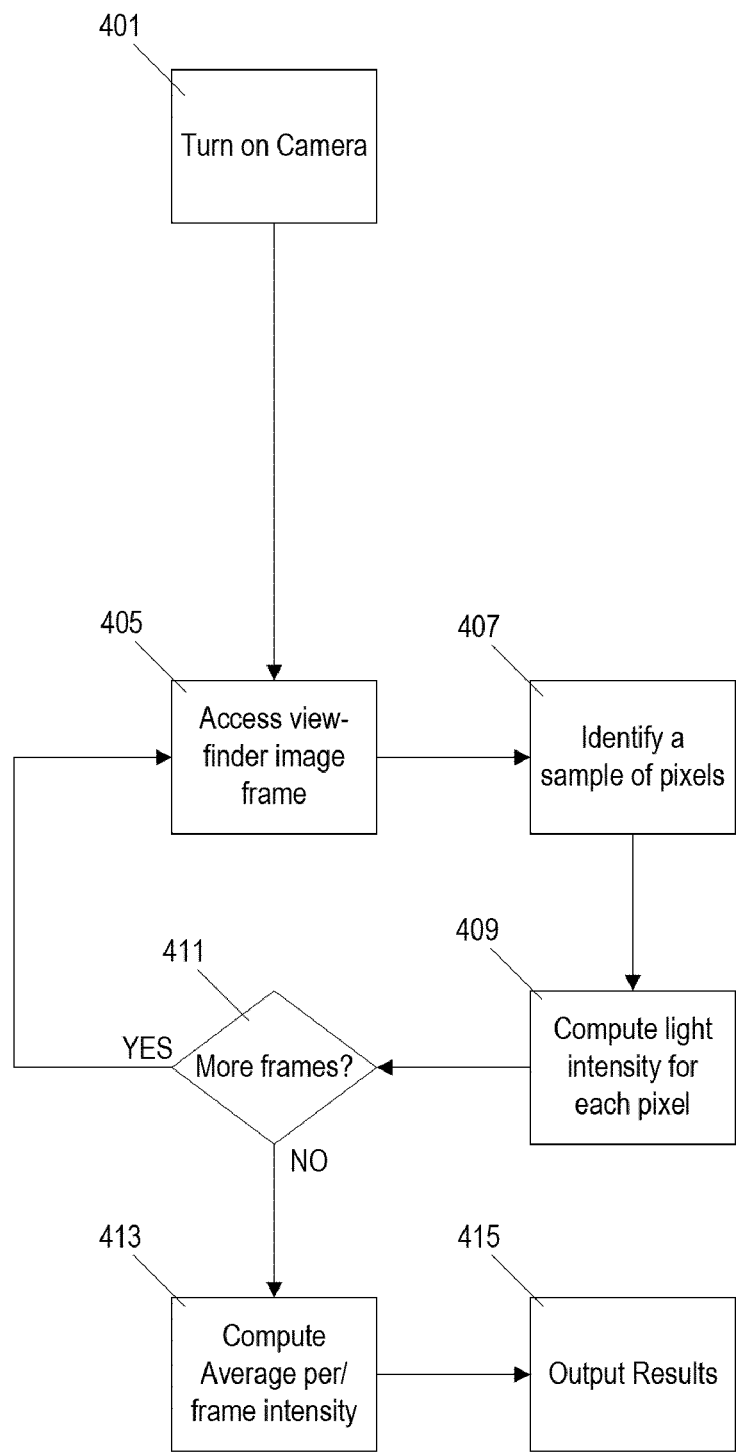
FIG. 4 is a flowchart showing the operation of the system when determining the level of light.

The "Level of Light" process, illustrated in FIG. 4, determines the level of light present in a room or area. Such a tool can be used, for example, by a blind person to determine whether there is light in a room. When the process is executed, the camera turns on (step 401) and the processor begins by analyzing the first view-finder image (step 405). In other embodiments, the "Level of Light" module can analyze a stored image or a stored video instead of the view-finder image. A series of evenly spaced sample pixels are selected from the view-finder image (step 407) and the light intensity of each sample pixel is computed (step 409). For a 1.0 Megapixel camera, using 100 sample pixels from each frame greatly reduces the data set and reduces the subsequent processing time accordingly. The intensity of each sample pixel is calculated according to the following equation: 1=(MaxRGB+MinRGB)/2, where I is intensity, MaxRGB is the highest value in the three integer RGB representation of the pixel, and MinRGB is the lowest value of the three integer RGB representation. For example, a pixel with the RGB representation [24, 0, 120] would have an intensity value of 60 (I=(120+0)/2=60). The processor can continue analyzing additional view-finder frames (step 411) for a set period of time or until the user turns off the "Level of Light" module. The processor 200 repeats the analysis (steps 405, 407, and 409) for each subsequent view-finder image frame.

After the last frame is analyzed, the processor 200 computes the average light intensity (step 413) and outputs the results to the user through the speaker 101 or the display 105 (step 415). In some embodiments, the processor 200 outputs a relative classification of the light condition rather than a numeric value. In one such classification system, an average intensity less than 30 is classified as "dark" lighting conditions, an intensity ranging from 31 to 100 is classified as "dim," 101 to 170 is normal lighting, and 171 to 255 is bright.

Figure 5:
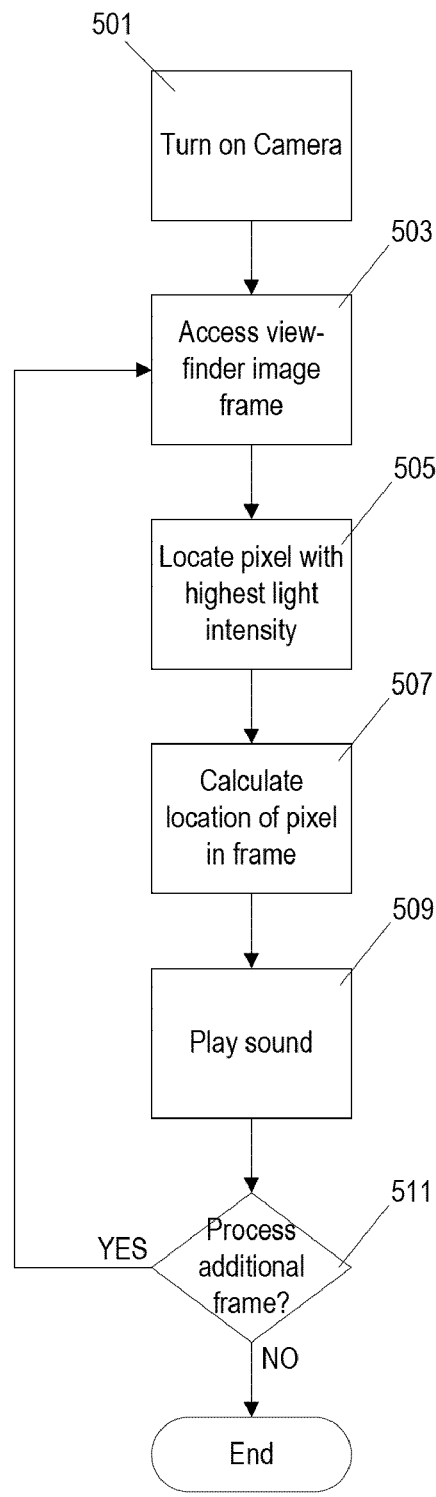
FIG. 5 is a flowchart showing the operation of the system when locating the source of a light.

FIG. 5 illustrates a "Light Source Finder" process that may be used in conjunction with the "Level of Light" process described above. The Light Source Finder detects the source of a light and outputs an auditory signal to the user indicating the intensity and size (e.g., "extend") of the light source. The Light Source Finder may be used, for example, by a blind person when turning off lights or electrical appliances in a room or when attempting to locate and exit in a building. When the process begins, the camera turns on (step 501) and accesses the view-finder image frame (step 503). The processor locates the pixel in the frame with the highest light intensity value using the equation described above in reference to the "Level of Light" module (step 505). The processor calculates the location of the pixel (step 507) and plays a sound indicating the relative size and intensity of the light source (step 509). The user can choose to continue capturing and processing additional frames (step 511) until the light source is centered in the image frame.

Additionally, the processor 200 can further characterize the type, size, and intensity of light that is present by calculating the "extend" of the light source. The system begins by determining the highest intensity pixel as illustrated in FIG. 5. The system then compares the light intensity of each adjacent pixel to a threshold difference. All adjacent pixels with intensities that are within the threshold difference from the highest intensity pixel are included within the extend. Furthermore, each pixel that is adjacent to a pixel that is included in the extend is also compared to the threshold difference. More formally, the extend of the highest intensity pixel [I(x,y)] is the sum of (i+j+k+v) in the following set of equations:

$$I(x,y)-I(x-z,y)<T, 0<z<=i$$

$$I(x,y)-I(x+z,y)<T, 0<z<=j$$

$$I(x,y)-I(x,y-z)<T, 0<z<=k$$

$$I(x,y)-I(x,y+z)<T, 0<z<=v$$

In such systems, the speaker 101 can provide information regarding the light source by emitting an audible tone. In some cases, the audible tone is set to a frequency based on both the intensity of the highest intensity pixel and the extend of the light source.

Furthermore, in some embodiments, the Light Source Finder module can provide additional functionality based on the algorithm illustrated in FIG. 5. For example, the processor 200 can indicate when the light source is outside of the captured image frame. If the pixel of highest intensity is at the furthest edge of the image frame, the auditory output signal can instruct the user to move the camera position to the left, right, up, or down until the highest intensity pixel is within the frame.

Figure 6:
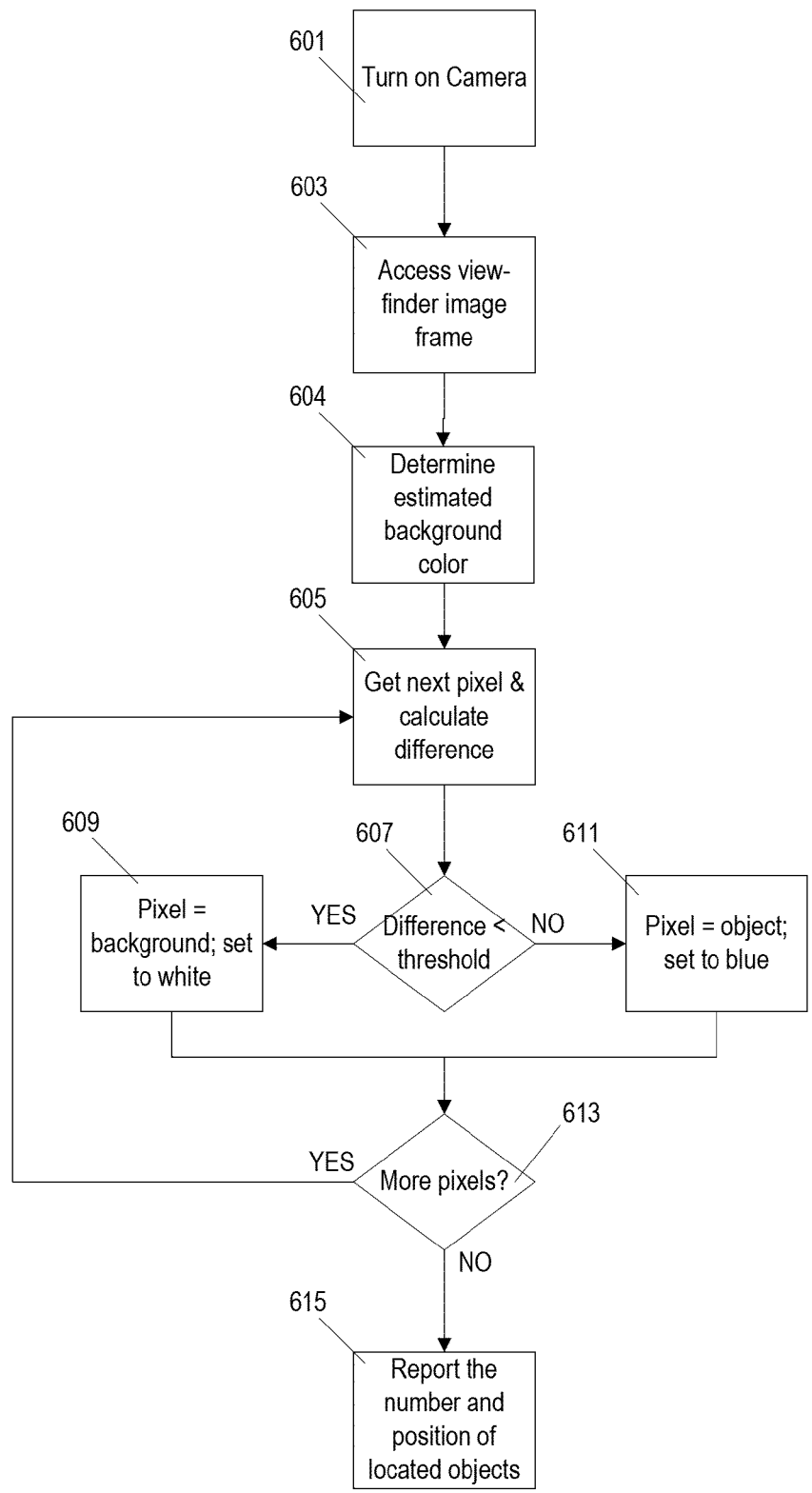
FIG. 6 is a flowchart showing the operation of the system when determining the location of an object.

The "Object Locator" process illustrated in FIG. 6 can be used to locate objects on a table or dropped objects on the floor. The algorithm described below assumes that the background color (e.g., the surface of the table or the floor) differs from the color of the object. The process begins by turning on the camera (step 601). The user directs the camera toward the area where the user believes the object may be located and analyzes the view-finder image frame (step 603). The process may include contrast enhancement, such as described above in reference to FIG. 3, to enhance the differences in color between the object and the background.

The processor 200 then calculates an estimated background color of the view-finder image. Because each pixel is encoded using RGB values, the processor 200 creates a voting system data structure that includes a bin for several ranges of RGB values. For example, a first bin can be used to count pixels whose R, G, and B values all fall between 0 and 50. The second bin can be used to count pixels whose R and G values fall between 0 and 50, but whose B value falls between 51 and 100. Subsequent additional bins in the data structure are defined similarly. A sample of pixels are selected from the image and counts are added to the appropriate bin in the voting system data structure. The sample of pixels can be selected depending upon the size of the image. In some embodiments, the module samples 100 pixels. The bin that holds the most counts is determined to represent the background color.

The processor 200 then analyzes each individual pixel to determine whether the pixel is object or background. The "Object Locator" module calculates the difference between the RGB values of the first pixel (pR, pG, pB) and the RGB values of the estimated background color (cR, cG, cB) (step 605). The difference is calculated using the following equation: difference (p, c)=(|pR−cR|+|pG−cG|+|pB−cB|). The difference is then compared to the threshold (step 607). If the difference is less than the threshold (i.e., the RGB values of the pixel are similar to the estimated background color), the processor determines that the pixel is background and sets the pixel to white (step 609). Conversely, if the difference is greater than the threshold, the processor determines that the pixel is an object and sets the pixel to black (or another selected color) (step 611). The processor repeats this analysis (steps 605, 607, 609, and 611) for each remaining pixel in the image frame (step 613).

When all pixels have been analyzed, the remaining image frame consists of only black or white pixels. The processor 200 then reports the number and position of objects identified in the image frame (step 615). In this example, objects are identified using region growing to identify connected components. If the processor 200 detects a black pixel, it determines whether adjacent pixels are black or white. If an adjacent pixel is black, that pixel is added to the same object (or connect component) as the first pixel. This method is used to determine the borders of an object. After the region growing is complete, the processor determines the size of the object (in number of pixels) and the number of objects in the image frame (e.g., other regions with adjacent black pixels or connected components). The processor 200 in some embodiments assumes that very large or very small connected components are either part of the background or insubstantial objects that do not need to be identified.

Auditory outputs can be provided through the speaker indicating either the size of the object (e.g., based on the number of pixels), the position of the object relative to the center of the image (e.g., left, right, top, or bottom), the number of objects in the image, or other types of information. Furthermore, the entire process (steps 603, 605, 607, 609, 611, 613, and 615) can be repeated until the object is located in the center of the image where it can be physically located by the visually impaired user.

Figure 7A:
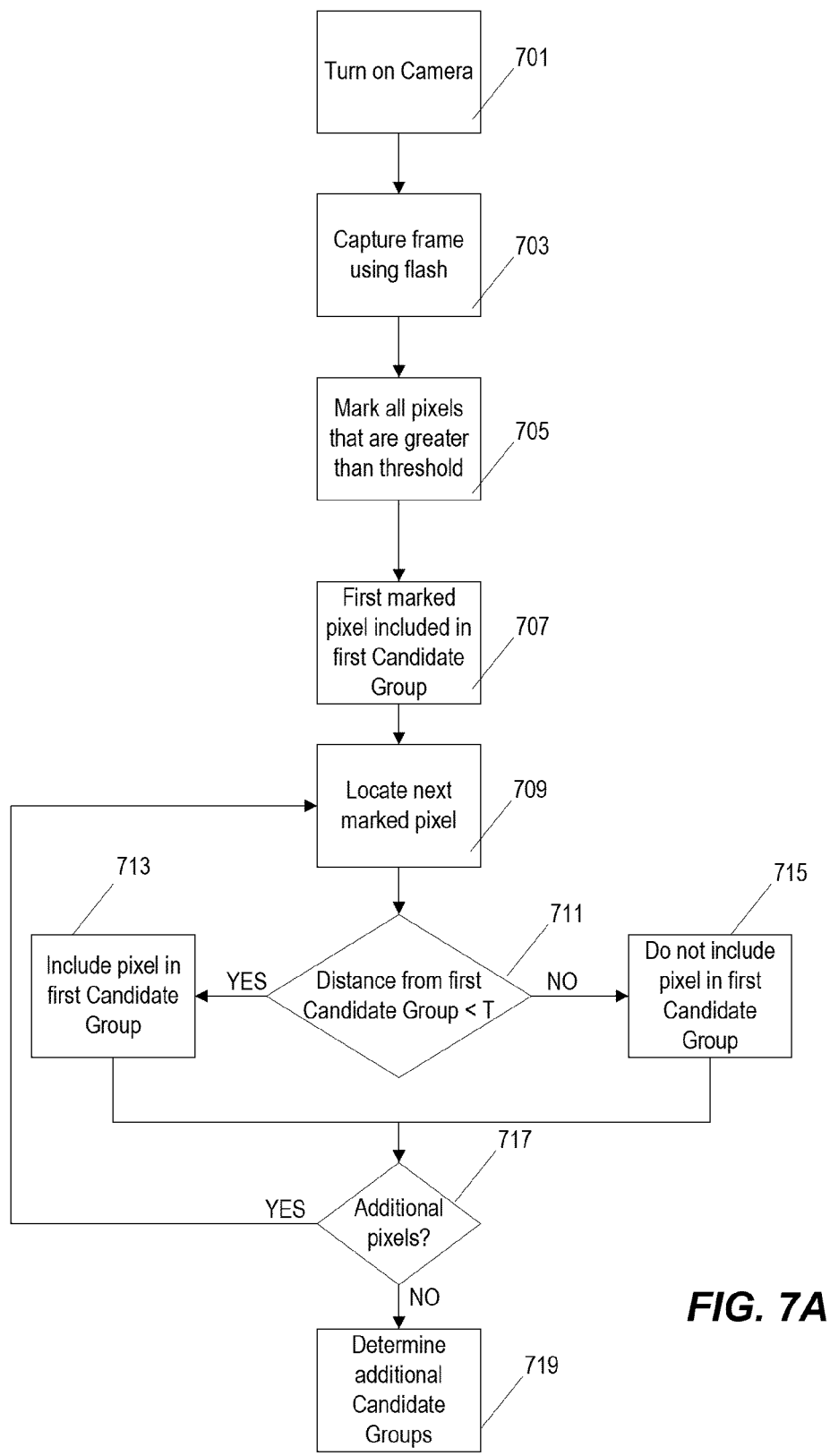
FIGS. 7A, 7B, and 7C are flowcharts showing the operation of the system when identifying the type of object in the image.
Figure 7B:
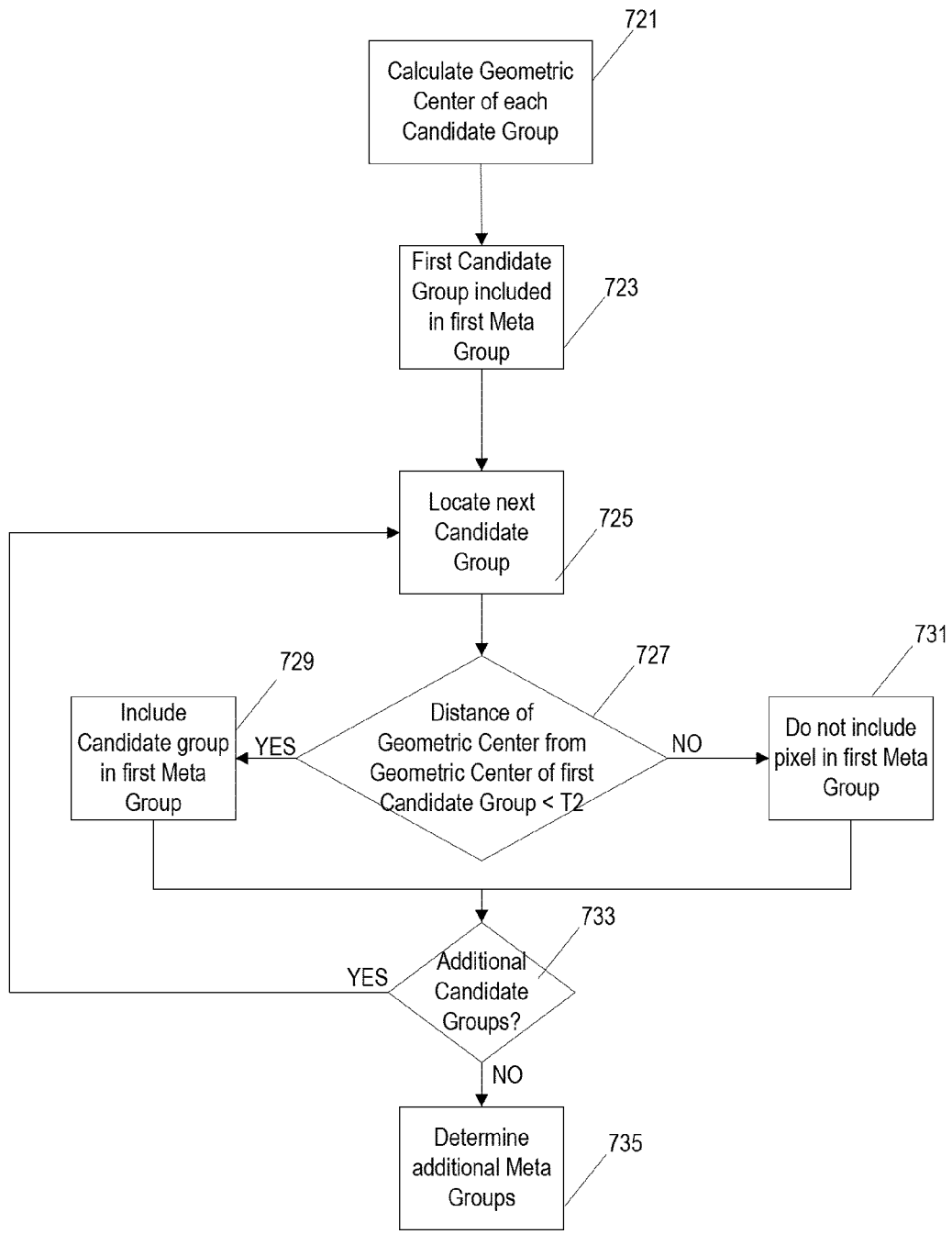
Figure 7C:
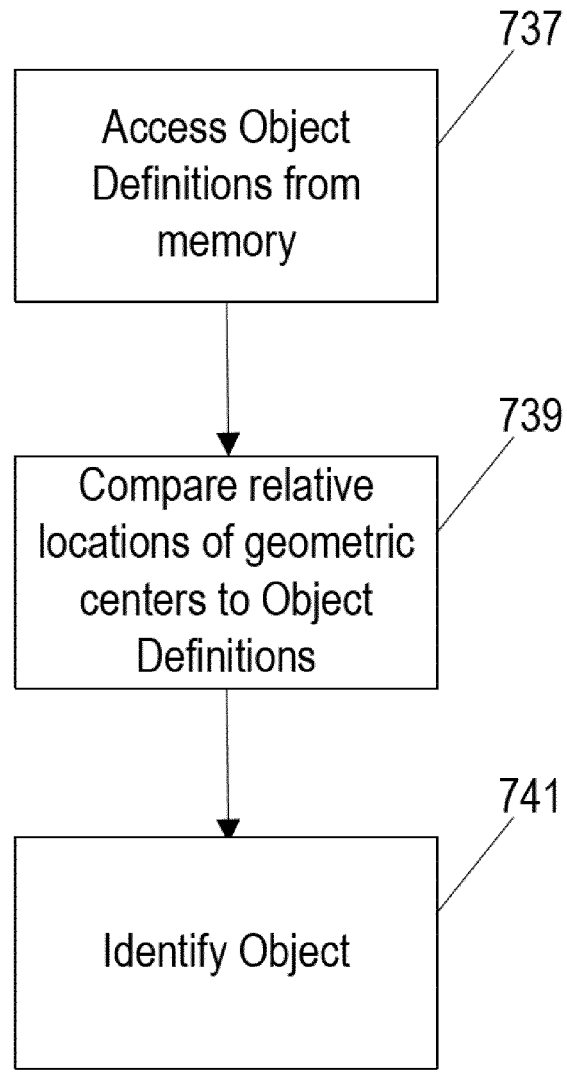

FIGS. 7A, 7B, and 7C illustrate a "Table Contents" module that identifies one or more objects located within an image frame using the flash mechanism of the camera. The basic principle used by the "Table Contents" module is that certain object will reflect the light provided by the camera's flash. These object will appear in a captured image as having a highest pixel intensity. As such, the "Table Contents" module locates these high intensity, reflective pixels and identifies an object based on the relative location of the pixels.

When the process begins, as illustrated in FIG. 7A, the camera is turned on (step 701) and an image frame is captured using the camera's flash mechanism (step 703). The processor 200 then marks all pixels that have a value greater than a threshold (step 705). Alternatively, the processor 200 can compare the pixel values to a range to filter out excessively bright or excessively dim pixels. This process is similar to the filtering described above in the "Object locator" process (FIG. 6).

Figure 8A:
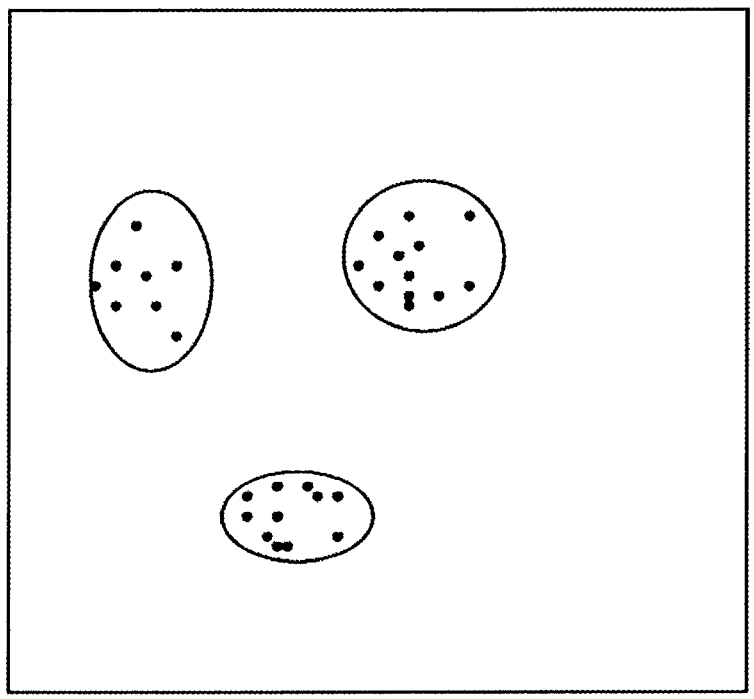
FIGS. 8A and 8B are examples of pixels groups into Candidate Groups and Candidate Groups grouped into Meta Groups.
Figure 8B:
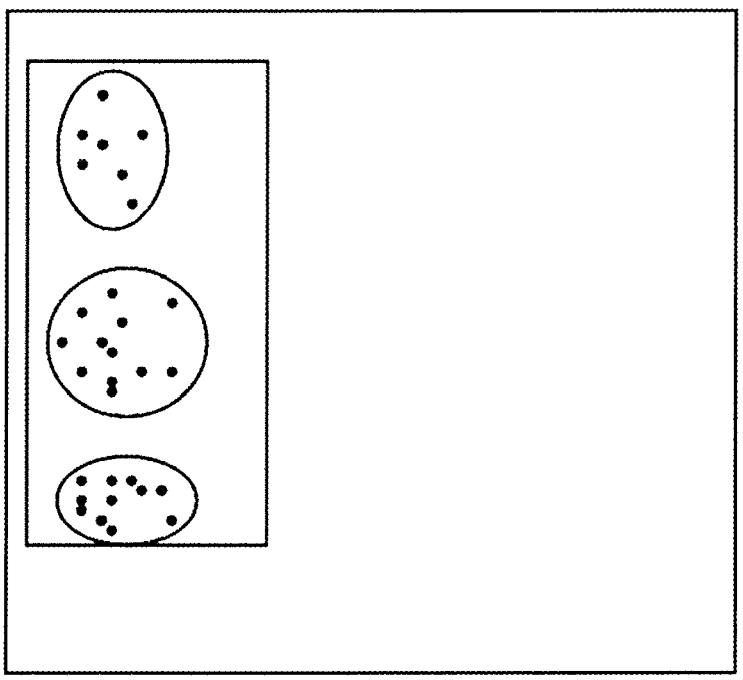

The processor 200 then generates a first Candidate Group by identifying a first marked pixel and including it in the first Candidate Group (step 707). Candidate Groups are groups of pixels that are located in the same area of the captured image. As such, the processor 200 continues to locate a second marked pixel (step 709) and determines the distance of the second marked pixel from the first pixel in the first candidate group. If the distance is less than a predetermined threshold distance, the second is included in the first Candidate Group (step 713). However, if the distance is greater than a threshold, the second marked pixel is not included in the first Candidate Group (step 715) and will be considered for inclusion in a different Candidate Group. The process repeats until all marked pixels are considered for inclusion in the first Candidate Group (step 717). When there are no additional pixels to consider, the processor 200 identifies a marked pixel that is not included in the first Candidate Group and repeats steps 709, 711, 713, 715, and 717 for a second Candidate Group (step 719). FIGS. 8A and 8B illustrate examples of marked pixels groups into Candidate Groups. The separate Candidate Groups are indicated by the circle around the marked pixels.

As illustrated in FIG. 7B, after including all of the marked pixels into one of the Candidate Groups, the processor 200 calculates the geometric center (or Centroid) of the pixels in each Candidate Group (step 721). The Candidate Groups are then grouped into larger Meta Groups. The Meta Groups represent pixels in different Candidate Groups that are identified as being part of the same object. To identify which Candidate Groups to include in each Meta Group, the processor 200 follows a similar procedure as was used to identify which marked pixels belong to which Candidate Groups. The processor 200 identifies a first candidate group and includes it as part of the first Meta Group (step 723). The processor 200 locates a second Candidate Group (step 725) and calculates the distance between the geometric center of the second Candidate Group and the geometric center of the first Candidate Group. If the distance is less than a second predetermined threshold (step 727), the second Candidate Group is included in the first Meta Group (step 729). However, if the distance is greater than the second threshold, the second Candidate Group is not included in the first Meta Group (step 731) and will later be considered for inclusion in a different Meta Group. The process continues until all Candidate Groups have been considered for inclusion in the first Meta Group (step 733). When no additional Candidate Groups remain, the processor 200 identifies a Candidate Group that is not included in the first Meta Group and repeats steps 725, 727, 729, 731, and 733 for a second Meta Group (step 735).

After the processor 200 has grouped all of the marked pixels into Candidate Groups and grouped all of the Candidate Groups into Meta Groups, the processor 200 proceeds to identify the object in the image. As illustrated in FIG. 7C, the processor 200 accesses a plurality of Object Definitions stored in the memory 111 (step 737) and compares the relative location of the Candidate Groups within each Meta Group to the Object Definitions (step 739). In some embodiments, the processor ignores the majority of the marked pixels and analyzes only the location of the geometric center of each Candidate Group to the geometric center of other Candidate Groups. Based on the relative locations, the object is identified (step 741). If there are more than one Meta Groups in the captured image, the processor 200 identifies each object in the frame. The identity of the object is output through the speaker as an audible tone indicative of the type of object or as a spoken word identifying the object. Alternatively, or in addition, the identity of the object in the image can be displayed on the screen as text.

FIGS. 8A and 8B provide two examples of how the objects in the images might be identified based on the process described in FIGS. 7A, 7B, and 7C. In FIG. 8A, the candidate groups are arranged in a circular pattern. Depending upon the contents of the object definitions stored on the phone's memory, the processor 200 might identify such a relative position as a circular plate. In some embodiments, the processor 200 considers both the relative location of the Candidate Groups and the size of the candidate groups. For example, in FIG. 7B, the three Candidate Groups are arranged in a vertical line and the topmost Candidate Group is thinner than the others. This may indicate that the object is a bottle.

The contents of the Object Definitions stored on the memory 111 can be customized for the user or for the location. For example, one user might be only concerned with identifying objects on a dinner table such as a plate (a circular arrangement of Candidate Groups), a glass (a rectangular border of Candidate Groups corresponding to the edges of the glass), and a bottle (a rectangular arrangement that is more narrow toward the top). Each of these objects would reflect the camera's flash and would produce high intensity pixels in the captured image. Some users, however, may wish to be able to identify objects that are not generally reflective such as a pencil, a book, or other object found in an office. The Object Definitions can be modified to detect such object if the objects are either made with a reflective material or marked with a reflective tape.

Other embodiments can utilize other methods of identifying the objects. For example, the analysis of the shape of the object can be based on the number of inflection points, the area of the object, and the overall shape of the object. An inflection point is a point on a curve where curvature changes sign. As such, inflection points are counted using a smoothed boundary curve of each of the detected objects in the image frame. The "inflection point" metric can differentiate between several shape types. For example, a circular plate does not have any inflection points whereas a fork has at least three (one between each tine).

Figure 9:
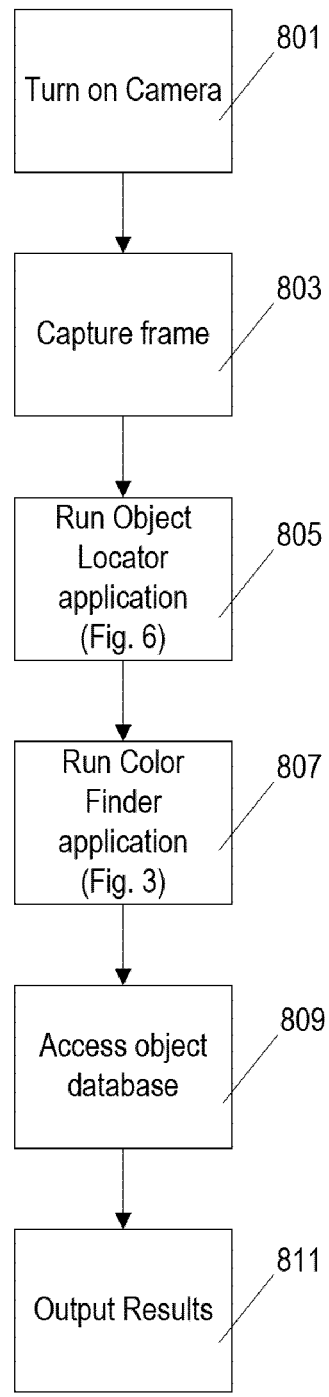
FIG. 9 is a flowchart showing the operation of the system when identifying and differentiating an object from other objects of similar shape and size.

FIG. 9 illustrates another process for object identification that further incorporates other methods described above. In this process, the system is able to distinguish between objects of similar shape and size—for example, different types of beverages stored in the same type of cylindrical can. The process uses both the object locator (FIG. 6) and color finder (FIG. 3) processes. The processor 200 turns on the camera (step 801). The user directs the camera toward the object of interest and captures an image frame (step 803). The processor then runs the object locator process (step 805) to identify boundaries of the object (e.g., the edges of the beverage can). The processor then runs the color finder application (step 807) using the object boundaries defined by the object locator as the analysis region. The processor then accesses an object shape and color database to identify and classify the object (step 809) and outputs the results through the telephone speaker 101.

The "Object Classification" process of FIG. 9 can also use an object shape matching algorithm similar to that described above in reference to FIGS. 7A, 7B, and 7C. After the object shape is identified, the processor 200 analyzes the contents of the histogram bins to determine the color combination stored in the database that most resembles the captured image. For example, a beverage can that is predominantly green will have a much different histogram profile than a beverage can that is predominantly red.

Figure 10:
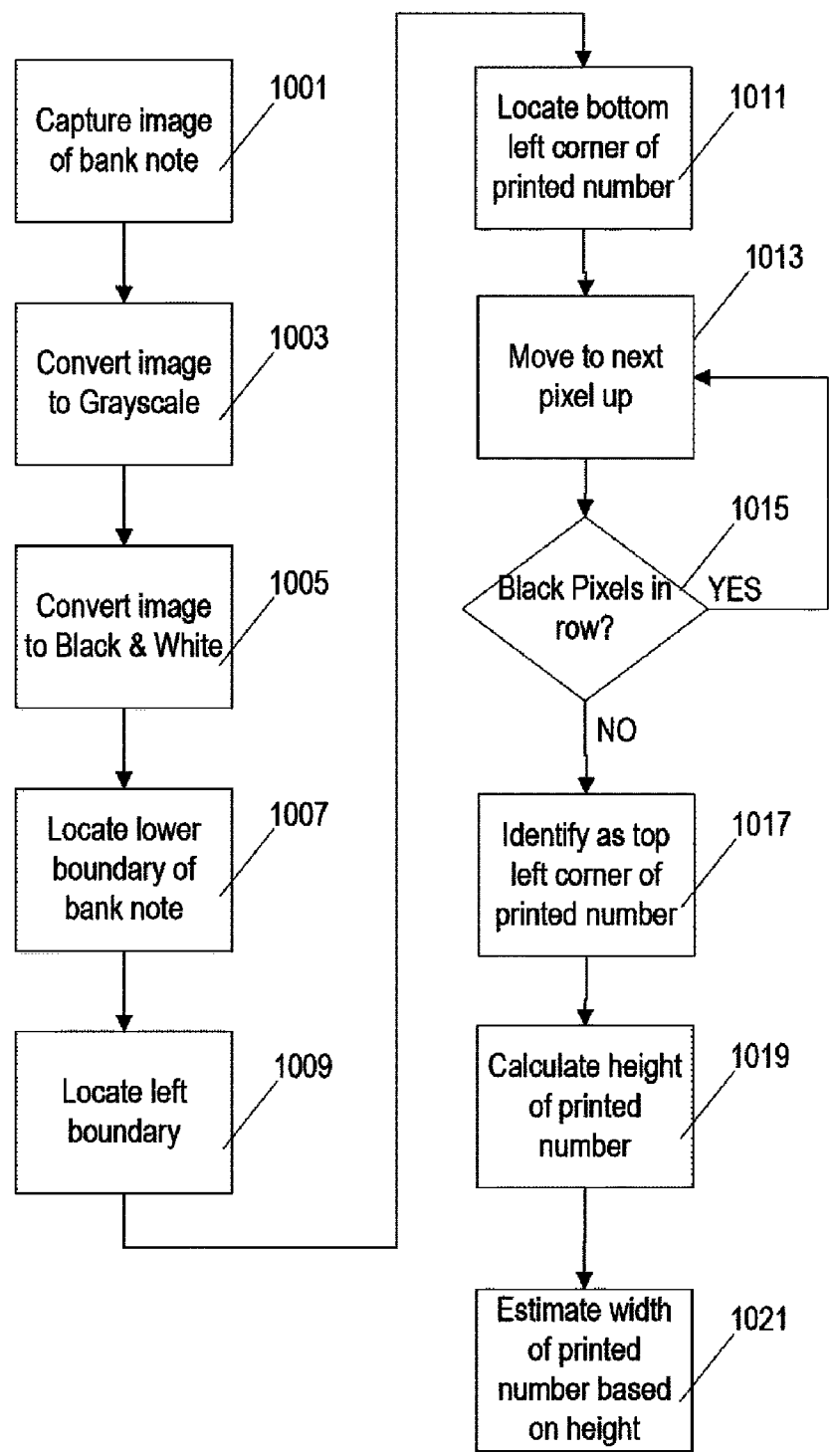
FIG. 10 is a flowchart showing the operation of the system when locating a numeric value printed on a bank note in an image captured by the camera.
Figure 11:
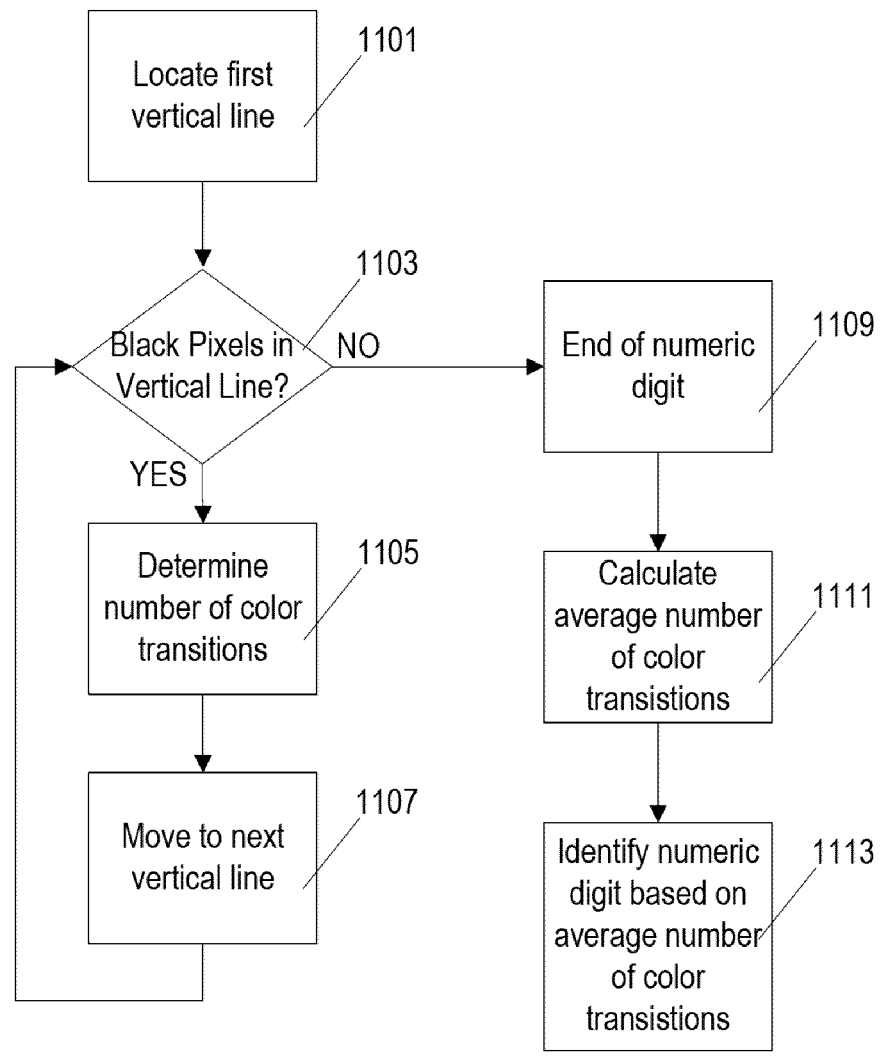
FIG. 11 is a flowchart showing the operation of the system when identifying the numeric value printed on a bank note in an image captured by the camera.

Another module provided for vision assistance is a "Bank Note Identification" module. Because bank note bills, whether U.S. or other currency, are typically printed on the same size paper, it can be difficult for the visually impaired to distinguish between different denominations. FIGS. 10 and 11 illustrate a two-way scanning method for locating the numeric value printed on the bank note (FIG. 10) and for identifying the numeric value (FIG. 11). The process begins by capturing an image of the bank note (e.g., U.S. dollar, Euro, etc.) (step 1001).

The image is first converted from an RGB color representation to grayscale (step 1003) using the following equation: grayscale (p)=0.30*R+0.59*G+0.11*B. The grayscale image is then converted to black and white (step 1005). This conversion is performed by identifying the minimum and maximum grayscale value in each row of pixels. The minimum and maximum grayscale value can occur in multiple pixels in the same row. The system then calculates the average maximum grayscale value and the average minimum grayscale value. Finally, the system calculates a threshold value, T, using the following equation: T=((Average Maximum)+(Average Minimum))/2. Each pixel in the image is then compared to the threshold value. Pixels with a grayscale value that is lower than the threshold are set to white. Pixels with a grayscale value that is greater than the threshold are set to black.

After the image is converted to black and white, the processor 200 locates the bottom boundary of the bank note (step 1007) and the left boundary of the bank note (step 1009). The boundaries can be identified as a line where to the black color of a hand holding the note or a table on which the note is placed (represented as a large field of black pixels) changes to the white background of the bank note. After the boundaries of the bank note itself are identified, the processor 200 identifies the bottom left corner of the printed number (step 1011) as the black pixel that is closest to the intersection of the bottom boundary and the left boundary. It should be noted that the corner of the bank note that is analyzed will depend upon the type of currency. For example, Euro bank notes include a number in the lower left corner that can be analyzed using this method. However, the lower right corner of United States bank notes can identified using the method described below. As such, the process illustrated in FIG. 10 will be appropriately modified for United States or other country-specific versions of the module.

The processor 200 then proceeds to determine the dimensions of the printed number in the image. The processor 200 moves up through the pixels like a cursor (step 1013) from the bottom left corner until the processor 200 detects a horizontal line or row of pixels that does not include black pixels (step 1015). The first row without black pixels is determined to be the top boundary of the printed number on the bank note. The processor 200 identifies the pixel directly above the bottom left corner in the row below the first row without any black pixels as the top left corner of the numeric value (e.g., the farthest left pixel) (step 1017). The height of the printed number is calculated as the distance between the top left corner pixel and the bottom left corner pixel (step 1019). The processor 200 then estimates the width of the printed number based on the calculated height (step 1021).

Depending upon the type of bank note, other methods can be used to isolate the printed number on the note. FIG. 11 illustrate a horizontal scanning method for identifying the printed number regardless of what method is used to isolate the printed number from the rest of the print on the bank note. Once the dimensions and location of the printed number have been identified, the processor 200 locates the first vertical line of the printed number (step 1101). According to this example, the line of pixels extending from the top left corner pixel to the bottom left corner pixel. The processor 200 determines whether there are any black pixels in the vertical line (step 1103). If so, the processor 200 determines the number of transitions between black and white pixels that are present in the line (step 1105) and proceeds to the next vertical line in the printed number (step 1107). The processor 200 repeats these steps until it encounters a vertical line that does not contain any black pixels. Such a line represents the end of a numeric digit in the printed number (step 1109). The processor 200 then calculates the average number of color transitions from white to black detected for the numeric digit (step 1111) and identifies the number based on the average number of transitions (1113). In other embodiments, the processor 200 calculates the average number of color transitions from black to white or both types of color transitions.

Figure 12:
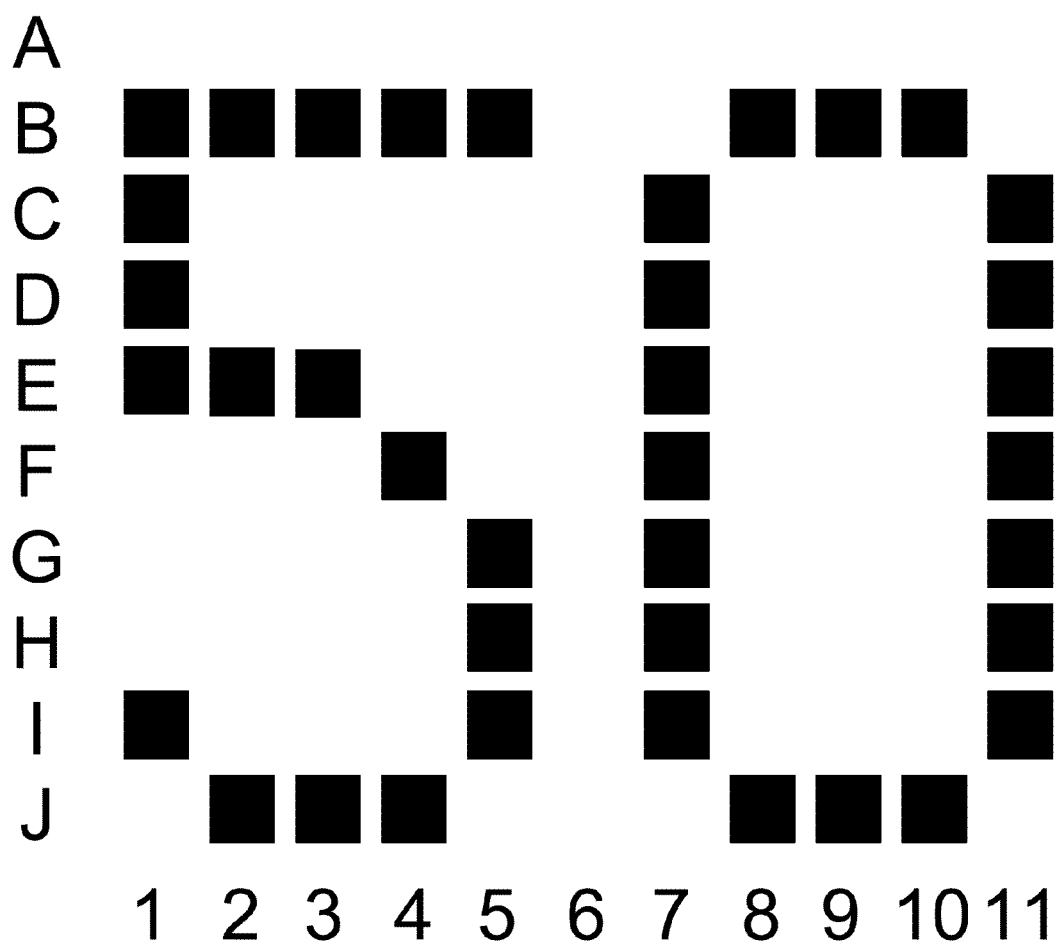
FIG. 12 is an example of a pixilated numeric value that has been isolated from the image of a bank note.

The method of FIG. 11 can be better understood with reference to an example. FIG. 12 provides an example of a black and white pixilated printed number as isolated by the process of FIG. 10. The vertical position of each pixel is referred below by the corresponding row letter and the horizontal position is referred to by the corresponding column number. In the method of FIG. 11, the processor 200 begins by analyzing the pixels in column 1 (step 1101). Because column 1 includes multiple black pixels (step 1103), the processor 200 counts the number of color transitions from white to black in column 1 (step 1105). Column 1 begins with a white pixel (row J) which transitions into a black pixel (row I). Another transition from white to black occurs at row E. Therefore, there are two color transitions in column 1.

Column 2 begins with a black pixel (row J). This is counted as a first transition to black. Additional white to black transition occur at row E and again at row B. It is noted that row A does not contain any black pixels. As such, the process illustrated in FIG. 10 identified row B as the top of the numeric.

The processor calculates the following number of color transitions for columns 1-5, respectively: two, three, three, three, two. At column 6, the processor 200 encounters a column without any black pixels (step 1103), thus indicating the end of the numeric digit (step 1109). The processor 200 then calculates the integer average number of color transitions for the columns corresponding to the first digit (step 1111). The integer average in this example is 3.

In other embodiments, the "Bank Note Identification" module ignores columns of pixels near the edge of the numbers. For example, in FIG. 12, the module may be configured to ignore the first and last columns in the printed number (i.e., columns 1 and 5 respectively). In such a case, the number of transitions in each column for the first number will be three, three, and three (for columns 2, 3, and 4, respectively).

As will be appreciated by those skilled in the art with the benefit of this disclosure, the integer average number of transitions will be one for the number "one," two for the number "zero," and three for the numbers "two" and "five." Most bank notes are issued in denominations including various combinations of these four numbers (e.g., $1, $5, $10, $20, $50, $100, etc.).

Figure 13:
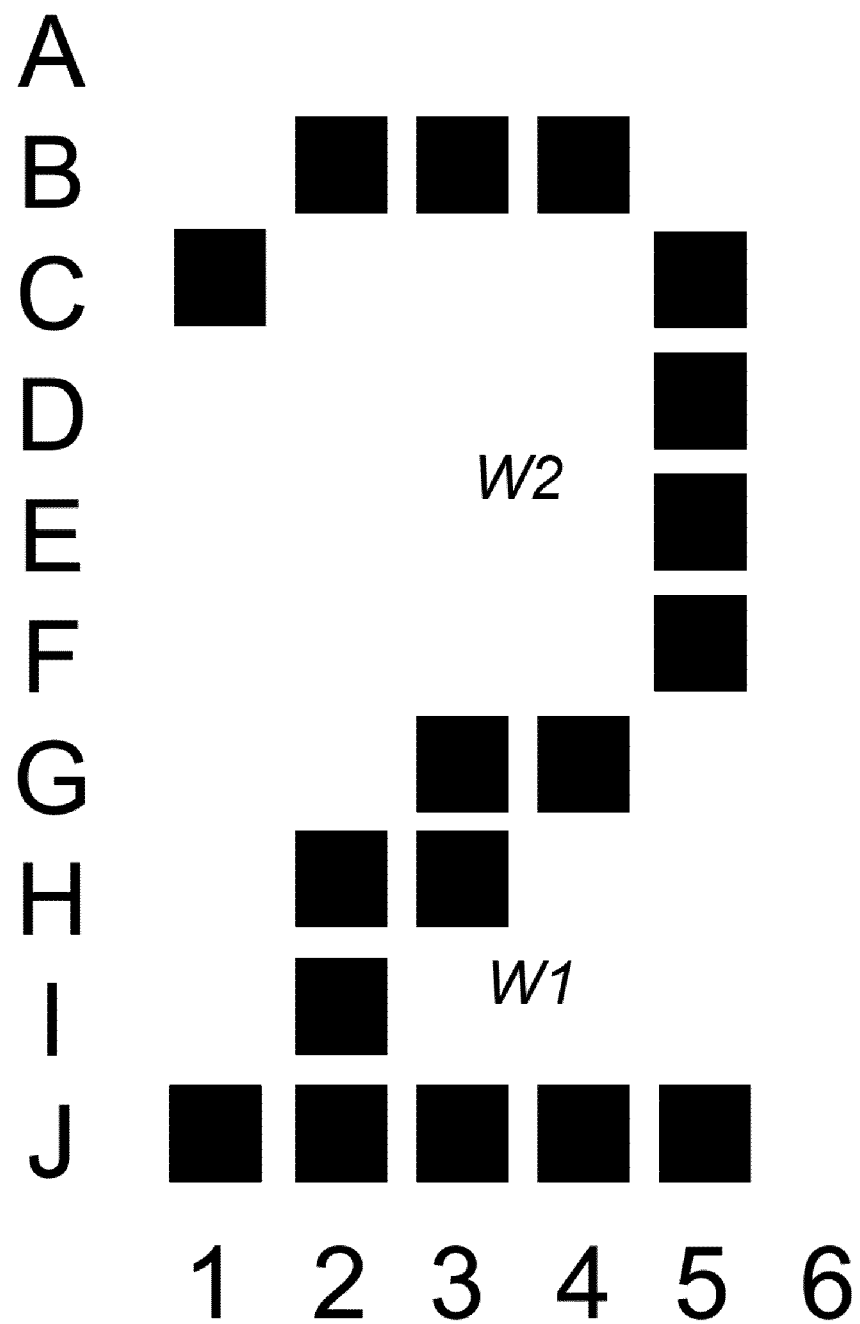
FIG. 13 is another example of a pixilated numeric value that has been isolated from the image of a bank note.

Although the numbers "five" and "two" both average three transitions per column, the processor 200 can differentiate between these numbers by other methods. As seen in FIG. 13, the area of white space in the upper half of the number "two" is much larger than the area of white space in the bottom half of the number. The "Bank Note Identification" module utilizes this characteristic to differentiate between the number "two" and the number "five." The module identified all of the columns that include three white to black transitions. The module then counts the total number of white pixels that immediately follow the first black to white transition ("W1") and the number of white pixels that immediately follow the second black to white transition ("W2").

In the example of FIG. 13, only columns 3 and 4 contain three white to black transitions. In column 3, W1 contains one white pixels and W2 contains four white pixels. In column 4, W1 contains two white pixels and W2 contains four white pixels. As such, for the example in FIG. 13, W1 equals three and W2 equals eight. Because W1<W2, the example of FIG. 13 is identified as a "two." Conversely, "five" in FIG. 12 has a W1 that equals eleven and a W2 that equals seven. Because, W1 is greater than W2 in FIG. 12, the number is identified as a "five."

Because the quality of the image captured by the camera can vary depending upon light conditions, quality of the black and white printed number may note always be as clear as the example of FIG. 12. As such, the "Bank Note Identification" module also includes various error protection features including one or more of the following error detection processes.

First, in some captured images, the first and second digits of a two digit number may not be entirely disconnected. For example the right edge of the "5" in FIG. 12 might touch the left edge of the "0." As such, there is no line detected between the two numbers where no black pixels are detected. The module checks for this condition by identifying the location of the first white to black transition in each column and comparing it to the location of the lower left corner of the printed number (e.g., the baseline of the printed number). If the location of the first white to black transition in a column exceeds a threshold distance from the baseline of the printed number, the module determines that the column represents the space between two digits in the printed number.

Furthermore, in some situations, the top pixels of the number "0" may be cut off, thereby causing the numeric digit to appear as a "U." The module detects this condition by verifying that the group of pixels is, in fact, a numeric digit by comparing the width of the number to a threshold. Because second and third digits in the printed number can only be a zero, the module assumes that any numeric digit that occurs after the first digit in the number must be a zero regardless of the average number of white to black transitions.

Because, in some bank notes, the printed number is followed closely by additional text or graphics, the module is able to distinguish between additional digits and non-numeric printing. As described above, because most bank notes come in denominations of $1, $5, $10, $20, $50, $100, etc., all digits after the first digit in a printed number must be zeros. As such, the module verifies that any subsequent "digits" in the printed number are zeros by ensuring that there are only two white to black transitions in the digit. Furthermore, the module can compare the number of black pixels between the first white to black transition and the first black to white transition (i.e., the bottom of the zero) to the number of black pixels between the second white to black transition and the second black to white transition (i.e., the top of the zero). If the numeric digit is a zero, the number of black pixels at the top of the column should equal the number of black pixels at the bottom. Also, most bank notes include a larger white space between the printed number and any adjacent non-numeric print than occurs between numeric digits in the printed number. As such, in some bank notes, the number of columns between two numeric digits that do not contain any black pixels will be much less than the number of columns between a numeric digit and other non-numeric text.

Lastly, the quality of the image can vary over time as shadows and lighting conditions change. As such, the module can analyze a series of frames either directly from the camera's view-finder image or images that have been stored to the memory 111. If a predetermined number of consecutive frames all identify the same printed number, the module determines that the identified number is correct and outputs the result to the user.

The processes described above provide a suite of functionality that better enables a visually impaired person to manage and navigate through their environment. By utilizing the digital camera 109 that is incorporated into a mobile telephone 100, the visually impaired user is able to benefit from the suite without carrying an additional piece of hardware.

The systems and methods described above are exemplary. The invention is capable of being carried out in different embodiments. For example, although the process instructions and the reference databases are stored in the telephone memory in the examples described above, other embodiments access this information through the telephone's wireless network. Therefore, more comprehensive databases can be used to more accurately identify objects. Similarly, in some embodiments, the telephone sends the captured image to a remote server, which then processes the image and sends the results back to the phone. In this way, the computational and image processing demands placed on the processor 200 are minimized. Also, as described above, the images that are captured and analyzed in the above methods and systems can either be captured and stored to memory or analyzed in real-time directly from the view-finder of the digital camera. Unless specifically stated otherwise, the term "capture" is used in this application to refer to any method of acquiring an image—either stored to memory or analyzed in real-time. Various features and advantages of the invention are set forth in the following claims.

What is claimed is:

1. A method of identifying a value of a bank note using a portable telephone with a built-in camera, the method comprising:
 capturing an image of the bank note;
 converting the image of the bank note to a black and white image;
 locating a numeric value printed on the bank note in the image;
 dividing the numeric value into a plurality of vertical lines;
 identifying a vertical line that includes only white pixels as an end of a first digit in the numeric value;
 determining a number of transitions between black and white in each of a plurality of vertical lines corresponding to the first digit;
 calculating an average number of transitions between white and black for the plurality of vertical lines corresponding to the first digit; and
 identifying the first digit based on the average number of transitions.

2. The method of claim 1, further comprising
 identifying the first digit as a one when the average number of transitions from white to black is one;
 identifying the first digit as a zero when the average number of transitions from white to black is two; and
 identifying the first digit as one of a two and a five when the average number of transitions from white to black is three.

3. The method of claim 1, further comprising:
 identifying a second vertical line that includes only white pixels as an end of a subsequent digit in the numeric value;
 determining a number of transitions between white and black in each of a plurality of vertical lines corresponding to the subsequent digit;
 calculating the average number of transitions from white to black for the plurality of vertical lines corresponding to the subsequent digit; and
 identifying the second digit as a zero when the average number of transitions from white to black is two.

4. The method of claim 1, further comprising identifying the first digit as a two when a number of white pixels in a first vertical line is greater than a number of white pixels in a second vertical line, wherein the first vertical line is a leftmost vertical line corresponding to the first digit and wherein the second vertical line is to the right of the first vertical line.

5. The method of claim 1, further comprising identifying the first digit as a five when a number of white pixels in a first vertical line is less than a number of white pixels in a second vertical line, wherein the first vertical line is a leftmost vertical line corresponding to the first digit and wherein the second vertical line is to the right of the first vertical line.

6. The method of claim 1, wherein locating a numeric value printed on the bank note in the image includes
 identifying a first plurality of pixels forming a bottom boundary of the bank note in the image;
 identifying a second plurality of pixels forming a left boundary of the bank note in the image;
 locating a bottom left corner of the numeric value printed on the bank note in the image by locating a first black pixel that is closest to an intersection of the left boundary and the bottom boundary;
 locating a top left corner of the numeric value printed on the bank note by
  analyzing a plurality of pixels forming a horizontal line from the bottom left corner of the numeric value,
  moving the horizontal line up one pixel when a black pixel is located in the plurality of pixels forming the horizontal line, and
  identifying the top left corner of the numeric value as a farthest left pixel in the horizontal line when all pixels in the plurality of pixels forming the horizontal line are white; and
 determining a height of the numeric value by calculating a difference between a vertical position of the bottom left corner and a vertical position of the top left corner.

7. The method of claim 6, further comprising estimating a width of the numeric value based on the height of the numeric value.

8. The method of claim 1, further comprising
 detecting the presence of multiple numeric digits in the numeric value printed on the bank note; and
 identifying the value of each numeric digit.

9. The method of claim 8, further comprising displaying an error message to a user if two or more numeric digits are identified as non-zero numbers.

* * * * *